Oct. 27, 1970 G. D. BOYD ET AL 3,536,931
OPTICAL RAMAN OSCILLATOR
Filed Dec. 20, 1968 2 Sheets-Sheet 1
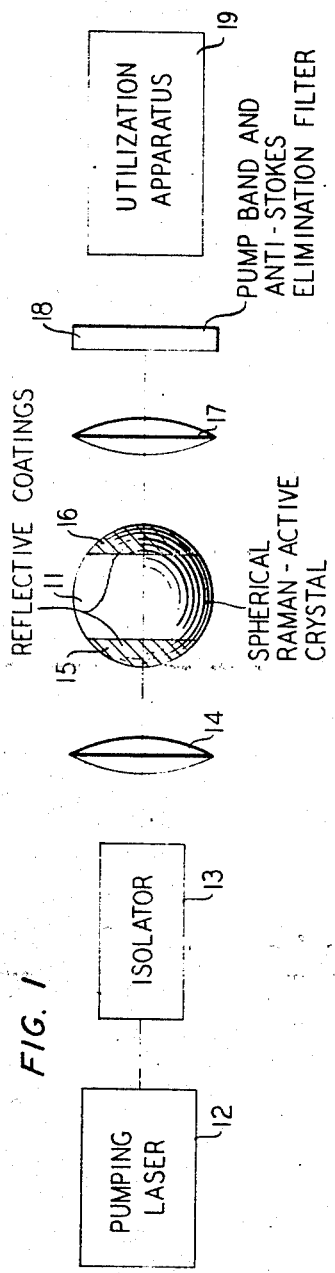
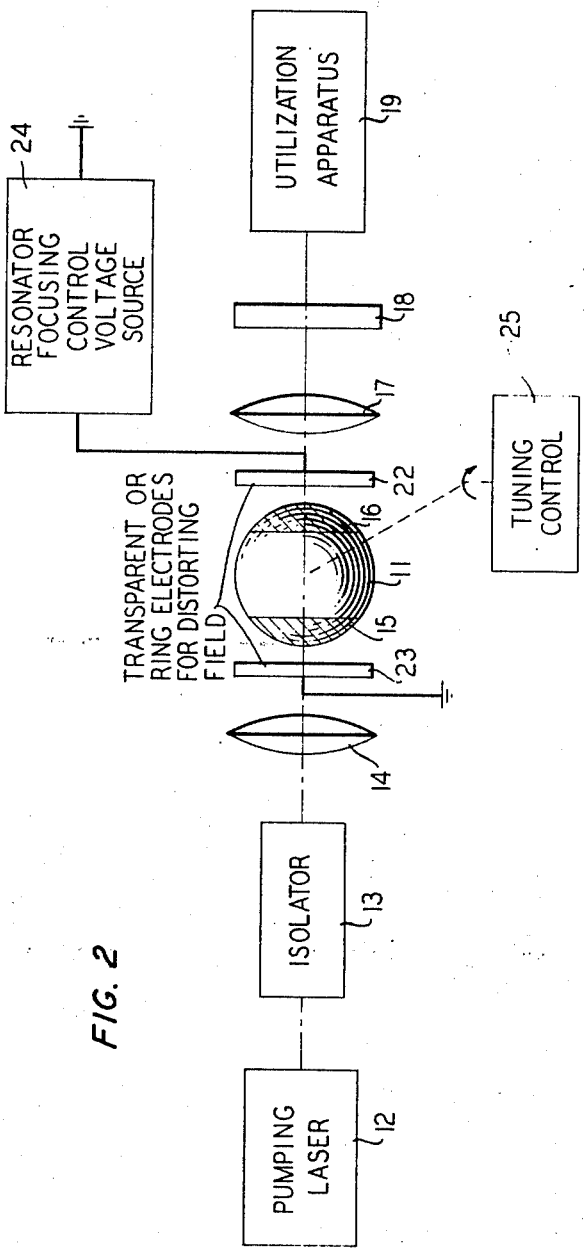
INVENTORS G.D. BOYD
W.D. JOHNSTON, JR.
I.P. KAMINOW

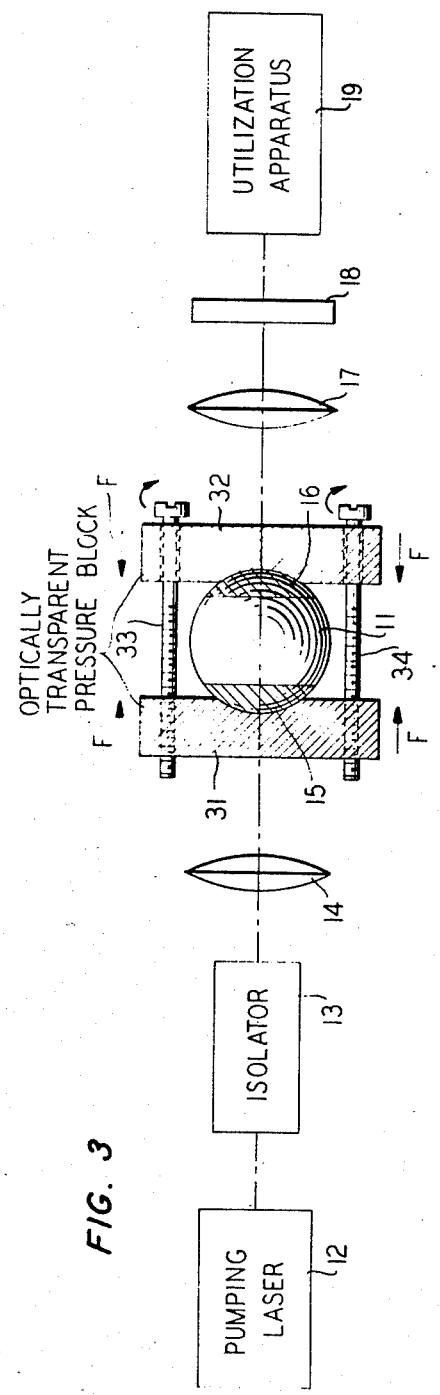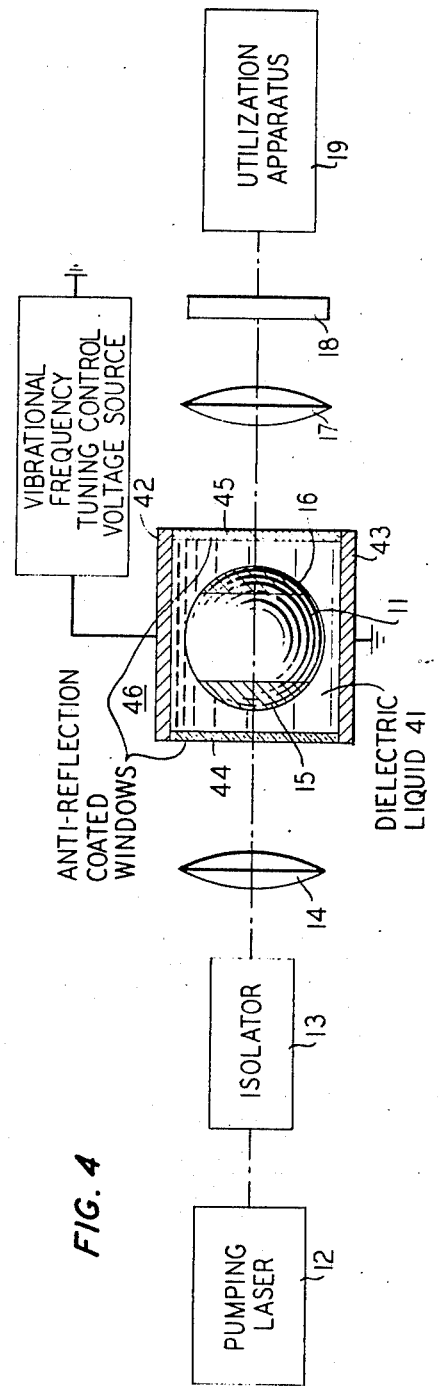

United States Patent Office 3,536,931
Patented Oct. 27, 1970

3,536,931
OPTICAL RAMAN OSCILLATOR
Gary D. Boyd, Rumson, Wilbur D. Johnston, Jr., Middletown, and Ivan P. Kaminow, New Shrewsbury, N.J., assignors to Bell Telephone Laboratories, Incorporated, Murray Hill and Berkeley Heights, N.J., a corporation of New York
Filed Dec. 20, 1968, Ser. No. 785,467
Int. Cl. H03f 7/00
U.S. Cl. 307—88.3      8 Claims

ABSTRACT OF THE DISCLOSURE

A coherent optical Raman oscillator is disclosed in which improved focusing, with reduced threshold and increased efficiency, is achieved, in a spherical or near-spherical form of the active medium on which are coated reflectors for the Raman-shifted frequency. This configuration can also be used as a coherent optical Raman amplifier. In either case, focusing adjustment can be provided by a controlled distortion of the spherical shape, and frequency tuning can be separately provided.

BACKGROUND OF THE INVENTION

This invention relates to coherent optical Raman oscillators and amplifiers.

Coherent optical Raman oscillators and amplifiers have potential applications in optical communication systems and laboratory instruments because of the large non-linearities at natural resonant frequencies of the active medium, the feasibility of simple continuous tuning arrangements and the less stringent requirements on the optical quality of the medium than the requirements for an electronic parametric oscillator.

In a Raman oscillator, an essentially monochromatic exciting radiation, hereinafter referred to as the pump radiation, is supplied to a suitable Raman-active medium to generate a coherent radiation, hereinafter referred to as Raman-shifted radiation or simply Raman radiation, which is shifted in frequency from the pump radiation frequency by an amount that is characteristic of the Raman-active medium. The frequency shift, or difference between input and output frequencies, is typically equal to the frequency of a lattice vibration called an optic phonon. An optic phonon in a medium is characterized in that atoms within a unit cell of the lattice move in opposite senses to one another.

To be useful in a Raman laser, the medium should have an optic phonon capable of scattering quanta from the pump radiation and reradiating quanta at the shifted frequency. The phonon is then said to be Raman active.

Most media employed in prior art Raman lasers are liquids, such as benzene, nitrobenzene or toluene. Recently, two of us, Johnston and Kaminow, have disclosed in copending patent application Ser. No. 728,302, filed May 10, 1968, and assigned to the assignee hereof, a superior solid material for a coherent optical Raman oscillator. An exemplary form of such material is lithium meta-niobate ($LiNbO_3$) employing the relatively rare $Li^6$ isotope.

We have considered it desirable to reduce the oscillation threshold for coherent optical Raman oscillators as much as possible. Such reduction is significant in oscillators employing solid crystalline material because the useful output can be substantially increased for a given pump power.

SUMMARY OF THE INVENTION

According to our invention, an improved configuration of a coherent optical Raman oscillator comprises an essentially spherically shaped Raman-active medium with integral reflectors thereon forming a resonator for the Raman-shifted radiation. In an amplifier according to our invention, the reflectivity of the surface of the active medium is reduced relative to that of an oscillator.

One surprising advantage of this configuration is that, according to our theoretical analysis, it provides nearly optimum focusing of the Raman-shifted radiation, contrary to the prevalent assumption that optimum focusing should be provided by a confocal or near-confocal focusing arrangement. The spherical shape provides a concentric spacing of the reflective surfaces for the Raman-shifted radiation; and this spacing is twice that of the reflector spacing in a confocal arrangement.

The result of the optimum focusing provided in our invention is a substantial reduction in the theoretical threshold of oscillation and a substantial increase in efficiency, gain and useful output. To this end, the pump radiation is preferably externally focused to have wavefronts of curvature essentially matched to the wavefront curvature of the resonated Raman-shifted raditation.

According to another feature of the present invention, the focusing of the Raman-shifted radiation can be adjusted by controlled distortions of the spherical shape of the active medium. Excessive diffraction loss at the mirrors for the concentric configuration may make such focusing control desirable.

One advantage of the spherical shape of the active medium is that it is easier to machine than many alternative shapes. Another advantage is that it is easier to orient the spherical resonator with respect to the pump beam than in alternative configurations.

BRIEF DESCRIPTION OF THE DRAWING

Other features and advantages of our present invention may be understood from the following detailed description, taken together with the drawing, in which:

FIG. 1 is a partially pictorial and partially block diagrammatic illustration of a basic embodiment of the invention;

FIG. 2 is a partially pictorial and partially block diagrammatic illustration of a first modification of the embodiment of FIG. 1 to provide focusing control;

FIG. 3 is a partially pictorial and partially block diagrammatic illustration of a second modification of the embodiment of FIG. 1 to provide focusing control and frequency control; and FIG. 4 is a partially pictorial and partially block diagrammatic illustration of another embodiment of the invention providing tuning control of the Raman vibrational frequency by an electric field.

DESCRIPTION OF ILLUSTRATIVE EMBODIMENTS

In the embodiments of the drawing, coherent optical Raman oscillations are to be generated in a body 11 of solid crystalline material, such as $Li^6NbO_3$, where $Li^6$ is the relatively rare isotope of lithium.

The oscillations are driven by coherent pumping radiation supplied from a pumping laser 12, which is illustratively a neodymium ion laser employing an yttrium aluminum garnet host and operating at about 1.06 microns. The pumping radiation is supplied through an isolator 13, which eliminates back-reflected pumping radiation, and through a lens 14 and reflective coating 15 into the Raman-active medium 11.

The unconsumed pumping radiation illustratively is not resonated in medium 11 and is passed through reflective coating 16 and lens 17 and is absorbed in the pump and anti-Stokes elimination filter 18. Alternatively, the unconsumed pump radiation may be reflected by coating 16, passed back through medium 11 to provide additional Raman gain. The remaining pump radiation then passes through coating 15 and is absorbed in the isolator 13. Illustratively, the filter 18 is an interference filter of known type tilted slightly off the optical axis of the system.

The Li⁶NbO₃ medium 11 of FIG. 1 has an essentially spherical shape; and the multilayer dielectric reflective coatings 15 and 16 together cover about thirty per cent (30%) of the spherical surface and are disposed to form a resonator axis along the direction of pumping light propagation. They are selected and deposited, according to techniques well known in the art, to be highly reflective for the Stokes radiation, which is the Raman radiation down shifted in frequency from the frequency of the pumping radiation. Illustratively, the wavelength of the resonated radiation will be about 1.095 microns for Li⁶NbO₃. The reflective coating 15 will be non-transmissive for Stokes radiation; while the reflective coating 16 will be about one percent (1%) transmissive for the Stokes radiation.

The output Stokes radiation is focused by lens 17 into utilization apparatus 19, which is illustratively an optical heterodyne receiver in which the Stokes radiation can serve as a local oscillator wave. A typical optical heterodyne receiver would employ a photomultiplier to mix the local oscillator light wave with an incoming signal-modulated light wave. Alternatively, coating 15 would be made about one percent (1%) transmissive and coating 16 non-transmissive for Stokes radiation. Then the Stokes radiation could be sent to the utilization device by means of a beam splitter or dichroic mirror placed at 45° between lens 14 and coating 15.

A typical form of the pumping laser 12 is found in J. E. Geusic et al., U.S. Pat. No. 3,252,103, issued May 17, 1966.

The isolator 13 is illustratively a conventional 45° Faraday-type polarization rotator between polarizers oriented at 45° relative to one another to pass the forward-propagating pump radiation.

The Li⁶NbO₃ spherical crystal 11 is readily machined to a spherical form by familiar sphere grinding techniques (ferrites are an example, as are ball bearings), such as tumbling in an abrasive raceway. The grit of the abrasive is changed to a finer size in several steps until the final finished surface is achieved. To this end, the crystal is typically transferred sequentially through several different raceways. The diameter of crystal 11 is illustratively 1 cm.

In operation, the pumping laser 12 preferably supplies the pumping radiation in a single transverse mode; and lens 14 focuses the pumping radiation so that its wavefronts are related to the wavefronts of the Raman-shifted (Stokes) resonated radiation in crystal 11, as specified by our theoretical analyses below. Specifically, the wavefronts are essentially matched in that a deviation from like curvature and spot size is provided, which deviation is directly related to the deviation from the spherical shape of the resonator. In the simplest case of a perfect sphere the wavefronts are provided with the same curvature. The relationship of the lens and resonator required to produce given wavefront curvatures is determined as taught by Kogelnik and Li in their article in Applied Optics, vol. 5, October 1966, p. 1550.

Our theoretical calculations show that, contrary to the intuitive expectation that the best focusing would be near confocal, the arrangement of FIG. 1 is actually substantially superior in terms of oscillation threshold and overall efficiency, i.e., threshold power may be cut in half. The optimum focusing condition can be described as concentric, or near concentric.

The following analysis explains why the focusing according to our invention is so advantageous.

With the pump intensity in a single Gaussian mode, the Stokes gain varies over the beam cross section. It is readily shown that strong focusing (small $w^2_{po}$ or $b_p$) increases the pump intensity and thus increases the gain.

In the foregoing, $w_{po}$ is the beam radius of the waist of the pumping beam, and $b_p$ is its confocal parameter in the crystal 11, where $b_p = w^2_{po} k_p$ and $k_p = n_p \omega_p / c$, $n_p$ being the index of refraction of the crystal 11 for the pump wave, $c$ the velocity of light, and $\omega_p$ the pump angular frequency. Under these conditions, the variation in pump intensity in the direction of propagation can no longer be neglected. The degree of focusing of the pump beam must then be optimized to minimize the threshold for Stimulated Raman Scattering (SRS).

Steady-state oscillation will occur when the round-trip gain for the Stokes radiation just equals the round-trip loss within the Stokes resonator. Let the power within the Stokes resonator be $P_s$ and the fractional decrement per one-way pass be $e_s$, i.e., $$\frac{\delta P_s}{P_s} = -e_s \qquad (1)$$

The round-trip loss within the Stokes resonator is $2e_s$. The pump beam of power $P_p$ is assumed to make only a single pass through the Stokes resonator; that is, the pump is not resonated. If the pump is resonated, then in the theory that follows, $P_p$ is simply interpreted as the one-way power flow within the resonator. In what follows, we assume the pump to be not resonated. A desirable configuration might also provide just two passes of the pump light, by making reflector 16 reflective for the pump radiation. The increment in Stokes power $\Delta P_s$ per pass is given by $$\Delta P_s = -\text{Imag.}\left\{\frac{\omega_s}{2}\int E_s^* \cdot P_s \, dx\, dy\, dz\right\} \qquad (2)$$

where $\omega_s$ is the angular, Stokes frequency $= \omega_p - \omega_v$, $\omega_v$ being the lattice vibrational frequency. From similar work in nonlinear optics one can write the pump and Stokes fields $E_p$ and $E_s$, respectively, in the $\text{TEM}_{00}$ modes as $$E_p = \frac{E_{po}}{1+i\tau_p} e^{-r^2 k_p / b_p (1+i\tau_p)} \qquad (3)$$

$$E_s = \frac{E_{so}}{1+i\tau_s} e^{-r^2 k_s / b_s (1+i\tau_s)} \qquad (4)$$

where $$r^2 + x^2 + y^2 \qquad (5)$$

and $$\tau = \frac{2z}{b} \qquad (6)$$

and $b$ is the confocal parameter of either the pump or the Stokes wave. Then from known relationships and Equations 3 and 4:

$$-\text{Imag.}\, E_s^* \cdot P_s = \epsilon_0 \chi_R'' \frac{|E_{po}|^2 |E_{so}|^2}{(1+\tau_s^2)(1+\tau_p^2)}$$

$$\cdot \exp\left\{-2r^2\left[\frac{k_p}{b_p(1+\tau_p^2)} + \frac{k_s}{b_s(1+\tau_s^2)}\right]\right\} \qquad (7)$$

Note that any arbitrariness in the phase of the pump relative to the Stokes wave in (3) and (4) would disappear in (7). The minimum beam radii $w_{so}$ at the waist of the Stokes wave is given by $$b_s = w^2_{so} k_s \qquad (8)$$

where $k_s = n_s \omega_s / c$, defined for the Stokes wave as the corresponding quantities were defined for the pump wave.

From the foregoing, the following Stokes power gain ratio can be derived:

$$\frac{\Delta P_s}{P_s} = \frac{4\mu_0}{\pi c^2} \frac{\omega_p \omega_s^2 \chi_R'' \sqrt{b_s b_p}}{\sqrt{(k_p b_s + k_s b_p)(k_p b_p + k_s b_s)}} P_p \tan^{-1} \xi,$$

$$\qquad (9)$$

where $$\xi = \frac{l}{\sqrt{b_s b_p}} \sqrt{\frac{k_p b_p + k_s b_s}{k_p b_s + k_s b_p}} \qquad (10)$$

and $l$ is the pathlength in the crystal 11.

In the limit of small gain, $$\frac{\Delta P_s}{P_s} \ll 1$$

no diffraction (i.e., $1/b_s$, $1/b_p \ll 1$) and $k_s \approx k_p$, as is usually the case; then $\xi \ll 1$ and (9) becomes $$\frac{\Delta P_s}{P_s} = \frac{4\mu_0}{\pi c^2} \frac{\omega_p \omega_s^2 \chi_R'' l}{(k_p b_s + k_s b_p)} P_p \qquad (11)$$

The effective or average one-way power gain of the Stokes wave is thus given by $$\bar{g}_s = \frac{1}{l} \frac{\Delta P_s}{P_s} = \frac{4\mu_0}{\pi c^2} \frac{\omega_p \omega_s^2 \chi_R''}{(k_p b_s + k_s b_p)} P_p \qquad (12)$$

If the Raman-active phonon mode in question lacks a macroscopic center of symmetry (i.e., is simultaneously Raman and IR active), the forward and backward Stokes radiation are not equivalent in general. For either the forwrd or backward Stokes wave, the SRS threshold is obtained by setting the appropriate one-way gain equal to the round-trip loss, $$\frac{\Delta P_s}{P_s} = 2e_s \qquad (13)$$

The reciprocal SRS threshold for arbitrary $l$, $b_s$ and $b_p$, but assuming $k_s = k_p$ is then given by:

$$\frac{2e_s}{P_p} = \frac{\mu_0 \omega_s^2 \chi_R''}{n_p c} \frac{4}{\pi} \frac{\sqrt{b_p b_s}}{(b_p + b_s)} \tan^{-1} \frac{l}{\sqrt{b_p b_s}}$$

$$= \frac{\mu_0 \omega_s^2 \chi_R''}{n_p c} F(l, b_p, b_s) \qquad (14)$$

The minimum threshold occurs in the limit $b_p \to 0, b_s \to 0$.

The implication of (14) is that a spherical sample with reflectors on the surface could act as a convenient Stokes resonator with $\xi \to \infty$. The pump beam would then be focused to the center of the sphere. Such a resonator is on the boundary of instability and would have large diffraction losses, but could be moved into the stable region by the application of an electric field or a mechanical stress. A sphere is relatively easy to make and is insensitive to rotation about the center, so that alignment may be accomplished by translation alone.

Examples of arrangements for moving the focusing into the stable region of near-concentric focusing are shown in FIG. 2 (electric field) and FIG. 3 (mechanical stress). It will be noted that in both these cases the focusing control changes the optical pathlength somewhat in relationship to the focal lengths of the reflectors. It is, from the optical viewpoint, a distortion of the spherical shape.

The modified embodiment of FIG. 2 is identical to that of FIG. 1 except that ring-type or transparent electrodes 22 and 23 are disposed about crystal 11 and connected across a variable voltage source 24 to supply a variable electric field therethrough without blocking the light beam path. Illustratively, the direction of the electric field is along the axis of light propagation; and a typical value of the electric field is about 1000 v./cm., producing a piezoelectric and/or electro-optic distortion of the spherical shape. In many Raman-active materials, both effects are obtained simultaneously, e.g., piezoelectric and electro-optic. Non-piezoelectric Raman media are electrostrictive; and electrostriction can be used in combination with a quadratic electro-optic effect. In each such case, it is desired that the optical spacing between reflectors be increased.

The optical separation of the reflective coatings 15 and 16 now is less than the concentric spacing by about 0.1 percent of the diameter of crystal 11. Illustratively, it may be desirable to adjust this spacing by varying the voltage from source 24 because the margin of stability can then be reduced to reduce threshold or increase efficiency or vice versa. It is noted that the crystal 11 would typically be firmly supported in a jig including an elastic support band (not shown) girdling the crystal in a plane normal to the propagation axis, or by bonding it to a mechanical shaft which can be rotated by control 25 to provide tuning control. In the latter case, the crystal is oriented to be rotated about an axis normal to the $c$ crystalline axis and also normal to the direction of light propagation.

In the modified embodiment of FIG. 3, the spherical shape of crystal 11 is distorted by direct application of mechanical force along the direction of light propagation, thereby reducing the spacing between reflective coatings 15 and 16 in the same sense and by the same amount as in the modified embodiment of FIG. 2.

Specifically, the reflective coatings 15 and 16 are seated in transparent plastic blocks 31 and 32, respectively. Appropriately spherically shaped hollows are ground in blocks 31 and 32 for this purpose. The exposed light-transmitting surfaces of blocks 31 and 32 would typically be antireflection coated.

Aligned, laterally displaced holes in blocks 31 and 32 admit the pressure-applying screws 33 and 34. The holes in block 31 are threaded, while those in block 32 provide a smooth bearing surface for the unthreaded portions of the screw shafts. Illustratively, there would be four such screws (two not shown) symmetrically disposed about the axis.

Clockwise rotation of the screw heads increases the pressure or distorting force exerted on crystal 11; and counter-clockwise rotation reduces it. This adjustment is done manually with a screwdriver. It will be noted that the applied force is axially symmetric.

In FIG. 4 the crystal 11 with coatings 15 and 16 is immersed in a dielectric liquid 41 which has a dielectric constant as near that of crystal 11 as possible, thereby insuring that most of the electric field appears in the crystal. For example, the liquid 41 may be nitrobenzene. The electric field is supplied through electrodes 42 and 43 energized from source 24. The electrodes 42 and 43 are sealed to the antireflection-coated windows 44 and 45, forming part of a container 46. This arrangement provides a uniform electric field within the spherical sample. Variation of this field can produce significant changes in the vibrational frequency and, hence, the Raman-shifted (Stokes) frequency, thereby providing continuous frequency control.

In the foregoing embodiments, it should be understood that the materials and components employed are merely illustrative and that similar advantages in reduction in threshold and increase in efficiency can be realized with other materials and components.

For example, other solid-state Raman-active media can be employed, and even liquid media in appropriate spherical containers are feasible for obtaining the basic advantages of the invention. Such a container would have reflective portions of its surface to form the resonator for the Raman-shifted radiation.

Moreover, it is feasible to resonate the anti-Stokes radiation, which is frequency-shifted upwards from the frequency of the pumping radiation, and to filter out the Stokes radiation in a filter comparable to filter 18.

In materials of sufficiently high refractive index at the resonated wavelength, separate reflective coatings are not required, when sufficiently high Raman gain is obtained.

For coherent Raman amplifiers at the Stokes or anti-Stokes frequencies, it may be necessary to antireflection coat the spherical crystalline surfaces, at least to a degree that brings the gain below the oscillation threshold.

What is claimed is:

1. Apparatus for producing stimulated Raman radiation, said apparatus being of the type comprising a Raman-active medium and means for supplying to said medium monochromatic pumping radiation to which said medium is substantially transparent to generate Raman activity in said medium, said apparatus being characterized in that said medium has an essentially spherical shape and forms a resonator for a scattered radiation derived from said Raman activity and the supplying means includes means for focusing said pumping radiation to have wavefronts essentially matched to the wavefronts of said scattered radiation.

2. Apparatus according to claim 1 in which the Raman-active medium comprises a solid body of material having an essentially spherical shape.

3. Apparatus according to claim 2 in which the resonator includes reflective coatings on the body of material.

4. Apparatus according to claim 1 including means for adjusting the focusing of the resonator, comprising means for deforming the spherical optical shape.

5. Apparatus according to claim 4 in which the medium is a piezoelectric electro-optic crystal and the deforming means includes means for applying an electric field to said crystal.

6. Apparatus according to claim 4 in which the deforming means includes mechanical means for applying compressive forces to the medium along the direction of propagation of the pumping radiation.

7. Apparatus according to claim 4 including means for tuning the frequency of the Raman-shifted radiation.

8. Apparatus according to claim 7 in which the medium is a solid body and the means for tuning the frequency of the Raman shifted radiation includes means for immersing said body in a liquid of like dielectric constant and means for applying a variable electric field through said liquid and said body.

No references cited.

JOHN KOMINSKI, Primary Examiner

D. R. HOSTETTER, Assistant Examiner

U.S. Cl. X.R.

330—4.5, 56; 331—96, 107